June 12, 1956 R. WEISS 2,749,819
COMBINED FLASHIGHT CONNECTING SOCKET AND SYNCHRONIZER
ADJUSTING MEANS FOR PHOTOGRAPHIC CAMERAS
Filed Jan. 31, 1955 2 Sheets-Sheet 2

2,749,819
Patented June 12, 1956

2,749,819

COMBINED FLASHLIGHT CONNECTING SOCKET AND SYNCHRONIZER ADJUSTING MEANS FOR PHOTOGRAPHIC CAMERAS

Richard Weiss, Braunschweig, Germany, assignor to Franke & Heidecke, Fabrik Photographischer Präzisions-Apparate, Braunschweig, Germany, a German firm Application January 31, 1955, Serial No. 485,157

Claims priority, application Germany February 6, 1954

7 Claims. (Cl. 95—11.5)

The invention relates to a plug and socket connection for connecting a photographic flashlight apparatus to a photographic camera, the plug and socket connection being detachable by release means which may be selectively employed for adjusting the flashlight synchronizing mechanism of the photographic camera.

An object of the invention is to provide a generally improved and more satisfactory plug and socket connection.

Still another object is to provide a detachable plug and socket connection having release means adapted for use in adjusting the flashlight synchronizing mechanism of a photographic camera.

A further object is to provide a plug and socket connection having a combined plug release and flashlight synchronizing adjusting member, in which the camera synchronizing mechanism may be adjusted either before or after the plug is inserted within the socket and which permits removal of the plug from the socket without affecting the camera flashlight synchronizer setting.

A still further object is to provide a plug and socket connection which is adapted for use with conventional photographic cameras and flashlight apparatus and is simple in construction and operation.

These and other desirable objects may be attained in the manner disclosed as an illustrative embodiment of the invention in the following description and in the accompanying drawings forming a part hereof, in which.

The same reference numerals throughout the several views indicate the same parts.

In the copending application of Hermann Bretthauer, Serial No. 387,119, filed October 20, 1953, a plug and socket connection is disclosed which is adapted to prevent accidental or unintentional loosening of the flashlight apparatus from the photographic camera with which it is used. These connections are adapted for interchangeable use with known and existing forms of flashlight and camera equipment and include a release means which permits the plug and socket to be rapidly and easily disconnected. In accordance with the present invention, the plug and socket connection disclosed in the above noted patent application is improved to permit the release means to also serve as means for adjusting the flashlight synchronizing mechanism of the camera in order that the flashlight electrical circuit is closed prior to or simultaneously with the maximum opening of the shutter blades, depending upon the type of flashlight being employed. In the disclosure of the present invention, the improvement is described as being applied to a plug and socket connection similar to that shown in Figs. 1–4 of said copending application, it being understood that the improvement is equally adapted for use with the other embodiment of said copending application.

Figure 1:
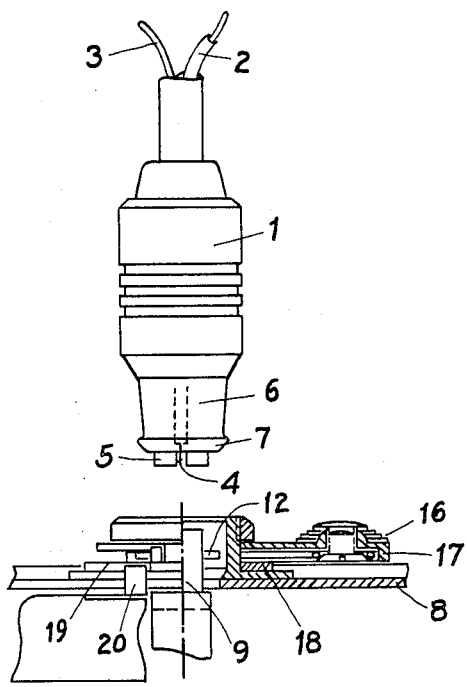
Fig. 1 is a view partly in side elevation and partly in longitudinal section of the socket and plug of the present invention, slightly separated from each other as in removing or inserting the plug.

As shown in Fig. 1 of the drawing, the plug body 1 is provided with a pair of wires or cables 2 and 3, each of which is connected to its respective terminal, such as the central contact pin 4 and the concentric split contact sleeve 5, both of which are formed of metal and are electrically insulated from each other. The wires 2 and 3 form a part of the electrical circuit of the flashlight apparatus, as more fully disclosed in said copending application.

The forward end of the plug body 1 (that is, the lower end when viewed as in Fig. 1) is provided with a conical guide portion 6 having on its free end an external bead 7, the front face of which is conical, while the rear face forms an abrupt shoulder extending radially, substantially in a plane perpendicular to the longitudinal axis of the plug. The bead or enlargement 7 may be described as a locking or retaining bead or detent, and the rear face thereof may be described as a retaining or locking face or abutment or shoulder. The entire plug, including the bead, may be essentially the same as, or in fact identical with, the plug disclosed in said Bretthauer application.

The socket for receiving the plug body 1 is suitably connected to the housing or body of the photographic camera, a portion of which is shown at 8 in Fig. 1, and includes a first contact bushing or sleeve 9, adapted to make a snug sliding fit within the split sleeve 5 of the plug when the plug is inserted by a longitudinal sliding movement into the socket, and a second or inner contact bushing or sleeve 10 which is concentric with the sleeve 9 and is adapted to make a snug sliding fit with the central contact pin 4 of the plug 1. The bushings 9 and 10 of the camera socket are both of metallic construction and electrically insulated from each other and form the opposite terminals of the electrical synchronizing circuit of the photographic camera, as described in detail in said copending application.

The camera socket also includes a stationary housing ring 11 which is concentric with and surrounds the contact bushings 9 and 10. The housing ring 11 is formed with two parallel tangential slots 12 and 13, substantially in a plane perpendicular to the axis of the housing, which slots receive portions of the two arms 14 and 15 of a hairpin type spring. The arms 14 and 15 of the spring are connected to each other by a looped portion 16 which lies in the recessed or dished portion of the actuating or release handle 17 which is rotatable about the ring 11. The spring receiving slots 12 and 13 are of such shape and dimension that they hold the spring arms 14 and 15 apart a distance substantially equal to the external diameter of the plug guide portion 6 directly behind the retaining shoulder of the bead 7, but they allow the spring arms to be moved farther apart when the spring is flexed.

Upon insertion of the plug 1 into the ring 11 of the camera socket, the central contact pin 4 of the plug will slide snugly within the inner sleeve 10 of the socket, the plug contact sleeve 5 will slide along the outer surface of the contact sleeve 9 of the socket, and the advancing conical surface of the bead 7 on the forward end of the plug will engage and spread the spring arms 14 and 15 until the plug reaches its home position, at which time the spring arms 14 and 15 will snap behind the locking shoulder of the plug retaining bead 7 and prevent the plug from being accidentally removed from the socket.

Removal of the plug from the socket, to disconnect the flashlight apparatus from the camera, is accomplished merely by rotating the actuating or release handle 17 relative to the stationary ring 11. Since the looped portion 16 of the hairpin spring remains within the recessed portion of the handle 17, the entire spring is turned with the handle, causing its arms 14 and 15 to be cammed outwardly into spread relationship (see Fig. 3), by their engagement with the external periphery of the stationary ring 11. In this position the locking shoulder of the plug retaining bead 7 is released from the spring arms 14 and 15, allowing the plug to be withdrawn axially from the socket.

The structure and mode of operation of the plug and socket connection thus far described, is similar to that disclosed in the above mentioned patent application. However, in accordance with the improved construction of the present invention, the actuating or release handle 17 is designed to serve an additional function, namely, that of adjusting the selector or change-over lever of the camera flashlight synchronizing mechanism of either M-flash contact, to delay maximum shutter blade opening until maximum flashlight illumination is obtained, or X-flash contact, in which the flashlight circuit is closed simultaneously as the shutter blades reach their maximum opening.

Figure 2:
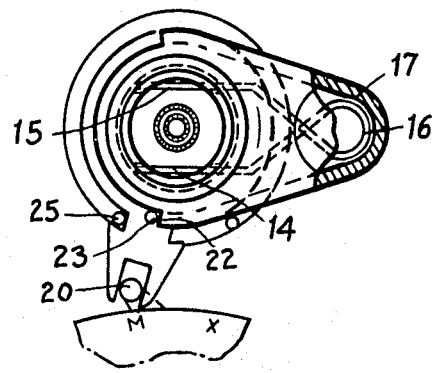
Fig. 2 is a top plan of the socket shown in Fig. 1, with the release means, shown partly in section, in locked position and the flashlight synchronizing mechanism of the photographic camera adjusted for use with M-type flashlamps.
Figure 4:
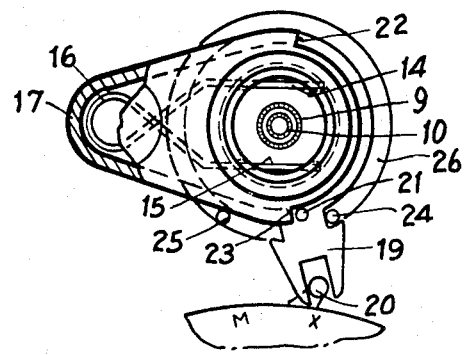
Fig. 4 is a view similar to Fig. 2 showing the release means in locked position and the camera flashlight synchronizing mechanism adjusted for use with X-type flashlamps.

To accomplish this additional function, a disk 18 is rotatably mounted on the socket stationary ring 11, below the operating handle 17, and is provided with a radial outwardly extending bifurcated arm 19, which engages with the selector or change-over lever 20 of the camera flashlight synchronizing mechanism, and with an upstanding drive pin 21 which lies in the path of the radial shoulders 22 and 23 formed on the handle 17. The selector lever 20 is a part commonly found on many modern cameras and is well known in the art, so need not be further described or illustrated. Contrary to the structure disclosed in the noted copending patent application, the handle 17 of the present construction is rotatable through approximately a 180° arc, during which rotary movement its shoulder 22 or 23 is adapted to contact with and move the upstanding pin 21 and its disk 18 about the socket ring 11. The movement of the disk 18 is transmitted through its arm 19 to the selector lever 20 of the camera synchronizing mechanism, causing it to rock into either the M or X flash contact setting, as shown in Figs. 2 and 4. As previously described, the plug 1 is normally inserted within the camera socket after the handle 17 is turned so as to dispose the spring arms 14 and 15 within the slots 12 and 13 of the socket ring 11. Therefore, the handle 17 may be moved to its position shown either in Fig. 2 or Fig. 4, to adjust the camera synchronizing mechanism before the plug 1 is inserted into the socket and may change this adjustment after the plug is installed, if desired.

Figure 3:
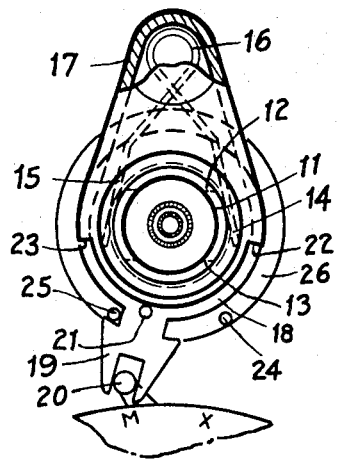
Fig. 3 is a view similar to Fig. 2 showing the release means in unlocked position.

Although the spring arms 14 and 15 reverse their locations when the arm 17 is moved from the position shown in Fig. 2 to that of Fig. 4, it will be noted that in either use the spring arms are disposed within the slots 12 and 13 of the socket ring 11, in position for engaging the locking shoulder of plug retaining bead 7. To release the spring arms from the shoulder of the bead 7, the actuating arm 17 is moved to an intermediate position as shown in Fig. 3 (that is 90° from either of the positions shown in Figs. 2 and 4) which effects an outward camming of the spring arms 14 and 15 as previously described. As seen in Figs. 2–4, the radial shoulders 22 and 23 are spaced slightly less than 180° (measured clockwise from the shoulder 22 to the shoulder 23) and thus the pin 21 and its disk 18 are moved only during the latter portion of the movement of the arm 17 from one of its extreme positions, such as shown in Fig. 2, to the other of its extreme position, such as shown in Fig. 4. In this manner unnecessary rocking and wear of the flashlight synchronizing mechanism is eliminated as the actuating arm 17 is moved to or from the release position shown in Fig. 3. In addition, damage to the flashlight synchronizing mechanism or disengagement of the bifurcated arm 19 from the selector lever 20 is prevented by providing stops 24 and 25 which are fixed either to the camera housing 8 or base plate 26 to limit the swing of the arm 19.

The improvement of the present invention has been described with particular reference to a plug and socket connection shown in Figs. 1–4 of the copending application of Hermann Bretthauer, noted above. However, the teaching of this improvement is equally well adapted for use with the modification shown in Figs. 5–8 of said copending application in which the hairpin spring is fixed and the slotted socket ring 11 is rotatable. In this case, it is merely necessary to couple the ring 11 to the handle 17 and the disk 18, or the bifurcated arm 19, so that its turning movement is transmitted to the selector lever 20 of the synchronizing mechanism of the camera. The handle 17 may, of course, be in the form of a knurled disk or segment if desired.

From the structure as described above, it is seen that the present invention provides an improved plug and socket connection in which the plug is adapted to be securely locked within the socket and which is releasable therefrom by an actuating or release handle which also serves as an adjusting means for the camera flashlight synchronizing mechanism. In this manner, the operator is able to adjust the camera synchronizing mechanism either before or after the plug has been inserted within the socket and the structure further enables the plug to be removed from the socket without affecting the setting to which such synchronizing mechanism has been adjusted.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

What is claimed is:

1. A separable connector for use on a photographic camera having a plurality of shutter blades movable between open and closed position, a flashlight synchronizing mechanism including an electric switch and a selector member adjustable for operating said electric switch in timed relation to movements of said blades, and an electrically operated photographic flashlight, said separable connector being adapted to operatively connect said switch electrically to said flashlight and including a plug having an insulated body and two electrical contacts mounted in said body and connected to said flashlight, a socket mounted on said camera in position to receive said plug therein and having two electrical contacts connected to said switch and positioned to mate with said contacts on said plug when said plug is inserted in said socket, said plug having a locking shoulder thereon, displaceable spring means mounted within said socket for engaging behind said shoulder to lock said plug in said socket until said spring means is displaced, rotary means mounted on said socket and operatively connected to said spring means and said selector member of said camera flashlight synchronizing mechanism, said rotary means being adapted to be turned to various positions to selectively adjust said selector lever of said camera synchronizing mechanism or to displace said spring means to release said shoulder to permit removal of said plug from the socket.

2. A construction as defined in claim 1, in which said rotary means includes a first rotary member operatively connected to said spring means and a second rotary member operatively connected to said selector member, said first and second rotary members being rotatable relative to said socket and to each other and including interengaging means adapted to transmit motion to one of said first or second members when the other of said members is turned.

3. A separable connector for use on a photographic camera having a plurality of shutter blades movable between open and closed position, an electric switch and a selector member movable for adjusting said electric switch for operation in timed relation to movements of said blades, and an electrically operated photographic flashlight, said separable connector being adapted to operatively connect said switch electrically to said flashlight and including a plug having electrical contacts connected to said flashlight, a socket mounted on said camera in position in receive said plug and having electrical contacts connected to said switch and positioned to mate with said plug contacts when said plug is inserted in said socket, said plug and socket having cooperating locking means adapted to lock said plug in said socket, and movable means mounted on said socket and operatively connected to said locking means and said selector member, said movable means being adjustable to various positions to effect release of said cooperating locking means or movement of said selector member.

4. A construction as defined in claim 3, wherein said movable means includes a first member operatively connected with said cooperating locking means and a second member operatively connected with said selector member, said first and second members mounted for rotatable movement relative to each other and said socket and being connected to each other through a lost motion connecting means whereby movement of one of said first and second members produces a movement of the other of said first and second members in the same direction but through a smaller angular distance.

5. A construction as defined in claim 4, in which said lost motion connecting means includes a pair of spaced abutment surfaces on one of said first and second members and a projecting pin on the other of said first and second members whereby movement of one of said first and second members in one direction causes said pin to engage with one of said abutment surfaces and movement in another direction causes the pin to engage the other of said abutment surfaces.

6. The combination with a photographic camera body having a socket for receiving a flashlight connecting plug and having a flashlight synchronizer control lever movable between two positions for respectively determining two kinds of synchronization, of a latch for resisting removal of a connecting plug from said socket, a latch controlling member movable from either of two extreme positions in which said latch is effective to an intermediate position in which said latch is ineffective, and means operatively connecting said latch controlling member to said synchronizer control lever to move said lever from one of its positions to the other when said latch controlling member is moved from one of its extreme positions to the other of its extreme positions.

7. The combination with a photographic camera body having a socket for receiving a flashlight connecting plug and having a flashlight synchronizer control lever movable between two positions for respectively determining two kinds of synchronization, of a latch for resisting removal of a connecting plug from said socket, a latch controlling member movable from either of two extreme positions in which said latch is effective to an intermediate position in which said latch is ineffective, and means operatively connecting said latch controlling member to said synchronizer control lever to move said lever from one of its positions to the other when said latch controlling member is moved from one of its extreme positions to the other of its extreme positions, said means including a lost motion connection so arranged that movement of said latch controlling member from either of its extreme positions to its intermediate position is ineffective to move said synchronizer control lever.

No references cited.